April 4, 1939.   D. J. CAMPBELL   2,153,173
METHOD OF MAKING BRAKE DRUMS
Original Filed Oct. 12, 1936   3 Sheets-Sheet 1
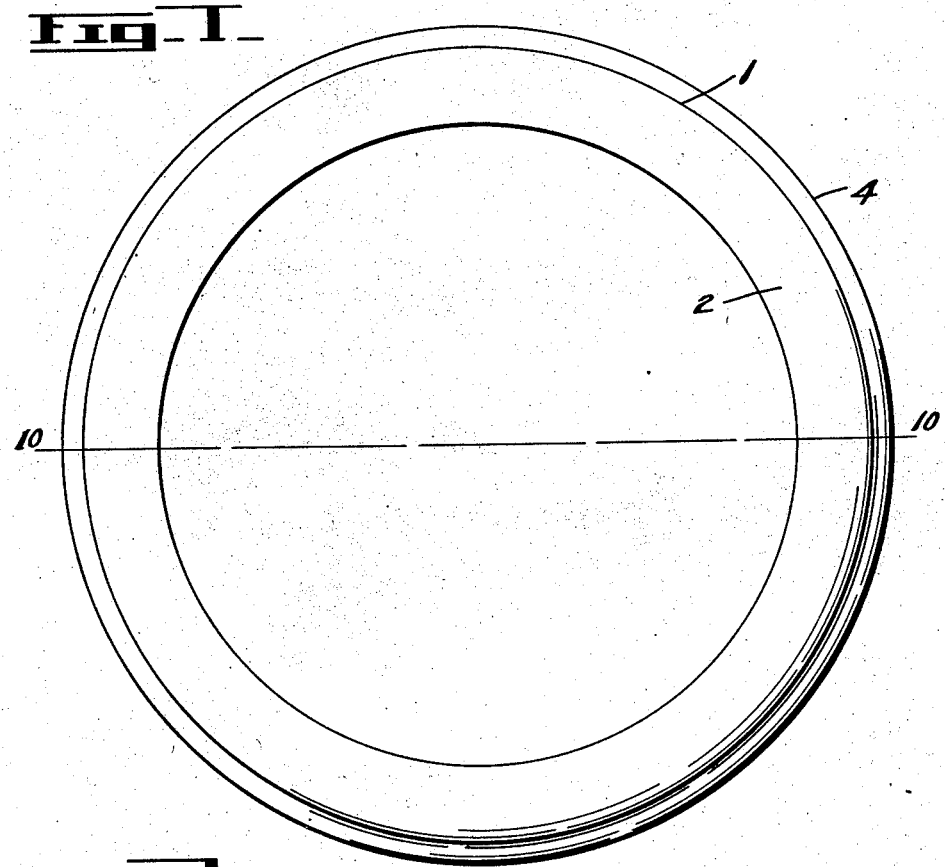
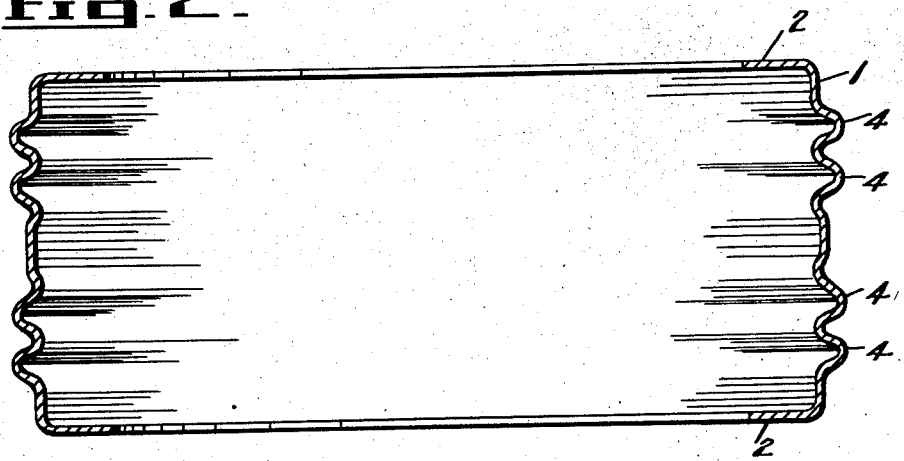
INVENTOR
DONALD J. CAMPBELL
BY Charles W. Dake
ATTORNEY April 4, 1939.                D. J. CAMPBELL                2,153,173
                        METHOD OF MAKING BRAKE DRUMS
                   Original Filed Oct. 12, 1936     3 Sheets—Sheet 2
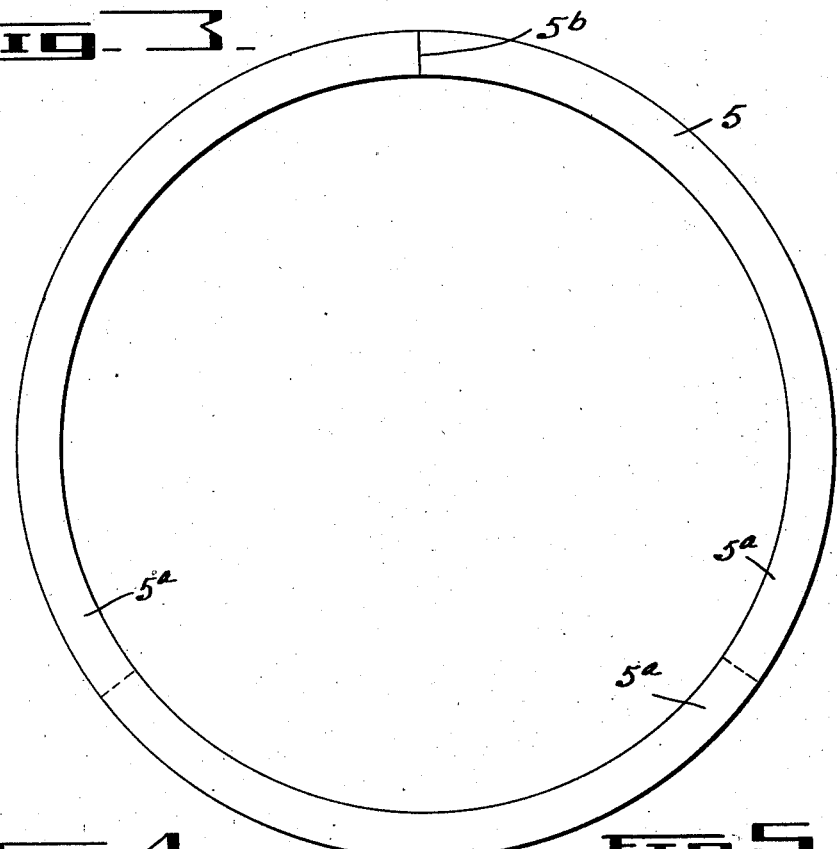
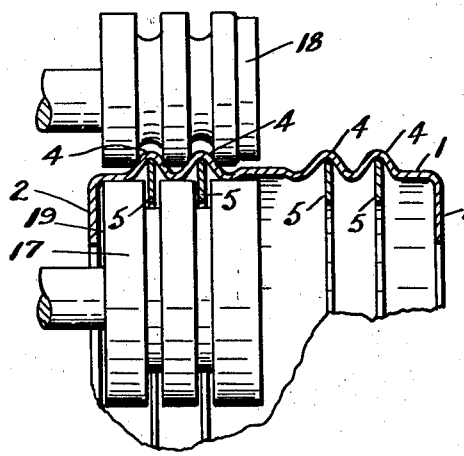
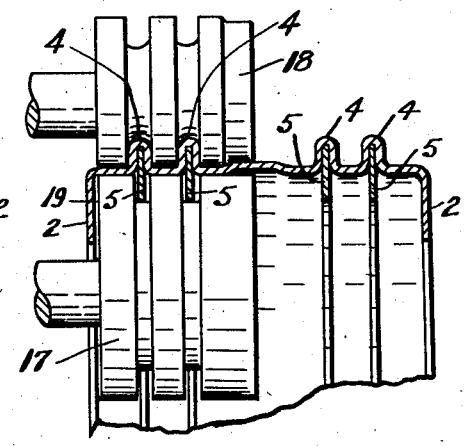
INVENTOR
DONALD J. CAMPBELL
BY Charles W. Dake
ATTORNEY April 4, 1939.   D. J. CAMPBELL   2,153,173
METHOD OF MAKING BRAKE DRUMS
Original Filed Oct. 12, 1936   3 Sheets—Sheet 3
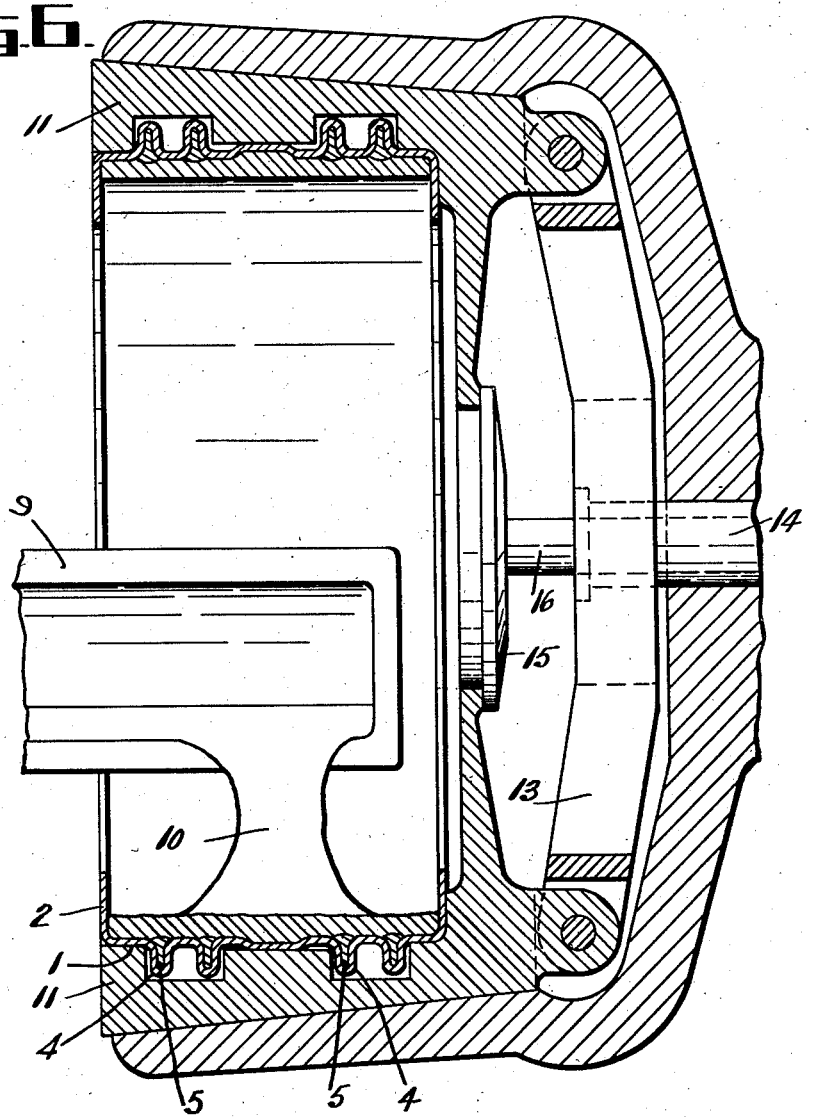
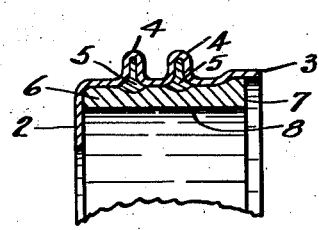
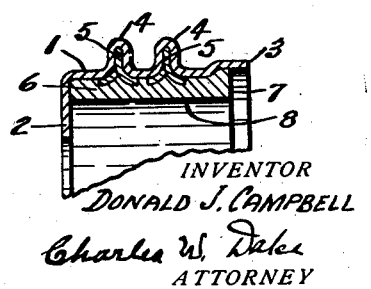
INVENTOR
DONALD J. CAMPBELL
Charles W. Dalee
ATTORNEY Patented Apr. 4, 1939

2,153,173

UNITED STATES PATENT OFFICE 2,153,173

METHOD OF MAKING BRAKE DRUMS

Donald J. Campbell, Spring Lake, Mich., assignor to Campbell, Wyant & Cannon Foundry Company, Muskegon Heights, Mich., a corporation of Michigan Original application October 12, 1936, Serial No. 105,293. Divided and this application July 27, 1937, Serial No. 155,889. Renewed November 7, 1938

3 Claims. (Cl. 29—152.2)

This is a divisional application taken from application, Serial No. 105,293, filed October 12, 1936, by applicant and includes the same description, like drawings and method claims submitted therewith, and My present invention relates to improvements in brake drums and particularly to an improved method of making brake drums of composite structure whereof a braking band of metal is cast into and fused to a supporting shell of steel and to a heat transfer member located within the shell; and the principal objects of improvement are to provide a composite brake drum having inherent means for increasing the heat transfer from the cast metal of the braking band to the steel supporting shell; to provide a composite brake drum in which the heat generated by friction caused by the application of the braking shoes will be more rapid than heretofore, and to provide a composite brake drum having the above said objects cheaply. These objects and others not specifically enumerated are attained and will be apparent from a perusal of the following description when taken in connection with the accompanying drawings, in which:

Figure 1 is a side elevation of my composite brake drum.

Figure 2 is a sectional view of the double width steel supporting shell of the brake drum.

Figure 3 is a side view of one of the heat transfer inserts employed.

Figure 4 is a sectional view of a double width supporting shell having the heat transfer inserts in position within the annular corrugations of the supporting shell and illustrating the corrugations bending rollers in position as when starting to close the corrugations onto the heat transfer insert.

Figure 5 is a sectional view as of Figure 4 illustrating the corrugations closed against the heat transfer insert by the corrugation bending rollers.

Figure 6 illustrates in section the double width brake drum supporting shell as during the operation of lining the same with molten metal.

Figure 7 is a sectional view of a portion of a completed composite brake drum of my preferred structure, illustrating the heat transfer insert after it has been melted by the molten metal and again solidified.

Figure 8 is a sectional view of a modified structure as of Figure 7 except therein the heat transfer insert has been cut and portions thereof bent against the inner periphery of the supporting shell.

Throughout the several views of the drawings, similar numbers refer to similar parts, and referring thereto:

1 represents the steel supporting shell from which, after it is lined, is cut as by severing circumferentially intermediate its ends two composite brake drums as illustrated by the fragmentary views shown in Figs. 7 and 8, consisting of the steel shell 1 having at one of its sides inwardly extending annular flange 2, axially extended flange portion 3, hollow annular corrugations 4 in which are located heat transfer inserts 5 preferably of copper or of other non-ferrous metal having a higher heat conduction factor than the steel of the supporting shell and that of the cast metal lining 6, which is machined at its radial side 7 to conform to suitable sealing means and at its inner periphery 8 to the required diameter for receiving any suitable braking shoes and mechanism and also to provide a smooth braking surface.

In Fig. 6 is illustrated a double width steel shell in the process of lining with molten metal, 9 representing a pouring box or ladle from which is being poured the molten metal 10 to form, when cooled, the lining or braking band 6. During the process of lining, the steel shell is preferably heated to a temperature that will prevent chilling of the molten metal as it is poured into the steel supporting shell which is then revolved while held concentric with the axis of rotation by taper chuck jaws 11 slidable in the conical bore of outer collet chuck member 12 by spider 13 secured to slidable shaft 14 and also by annular head 15 secured to slidable shaft 16.

In Fig. 4 is shown roller 17 pressing against the inner periphery of the supporting shell 1 and adjustable roller 18 in contact with the outer wall surface of the corrugations 4 as the operation of bending the walls of the corrugations to press the walls in against the heat transfer inserts 5 is begun. 19 represents clearance between the roller 17 and the inward radially extending flange 2 of the shell 1, whereby as the corrugation walls are bent against the heat transfer inserts 5, the said flange 2 is permitted to move toward the roller 17 freely. In Fig. 5 the clearance 19 is less because the roller 18 has pressed the walls of the corrugations tightly against the sides of the heat transfer inserts and the flange 2 has consequently been drawn towards the roller 17.

In the production of my present improved composite brake drum, I first provide the double width supporting shell 1 as by forming from sheet steel, with an inward radially extending flange 2 at each of its ends and intermediate the flanges 2 with a centrally located enlarged diameter to form thicker or heavier portion adjacent the axially extended flange 3, and outwardly extending annular corrugations 4 in the form shown in Fig. 4 with their opposite sides flaring or in inclined relation to each other. I then insert the circular heat transfer inserts 5 which are each composed preferably of a split copper ring 5a as shown in Fig. 3, split as indicated at 5b to allow the ring to be sprung in order that it may be placed within the groove of the annular corrugation 4 and roll or otherwise press the sides of the annular corrugations 4 securely against the opposite sides of the heat transfer insert 5 as shown in Fig. 5, after which the steel supporting shell is placed in a suitable spinning machine where the supporting shell is revolved rapidly and molten metal, such as iron having a sufficiently high temperature to produce a plastic film on the inner periphery of the steel supporting shell and to melt the transfer member, is deposited within the rotating steel supporting shell and fused thereto, causing the heat transfer insert to be fused to the walls of the annular groove of the annular corrugations and to the metal lining 6.

I claim:

1. The method of making brake drums which comprises providing a cylindrical steel shell having between its ends a plurality of outwardly extending annular corrugations, locating in said corrugations heat transfer members, bending the side walls of said corrugations against the sides of said heat transfer members, revolving the said steel shell and heat transfer inserts and while the shell is revolving, casting into the said shell and onto the said heat transfer members a metal lining, cooling the said shell, lining and inserts, severing the shell and lining circumferentially into a plurality of brake drum portions.

2. The method of making brake drums which comprises providing a cylindrical steel shell having at one of its ends an inward, substantially radially extending flange, and intermediate its ends an outwardly extending hollow annular corrugation, locating in the hollow of said corrugation a heat transfer insert member, bending the walls of said corrugation against the said insert, revolving the said shell and insert and while revolving, casting onto said insert a metal braking band member.

3. The method of making brake drums which includes the acts of providing a cylindrical shell having intermediate its ends an outwardly extending corrugation, locating in said corrugation a heat transfer member, pressing the walls of the corrugation against the heat transfer member and casting onto the heat transfer member a lining for the said shell.

DONALD J. CAMPBELL.